Sept. 25, 1934.  D. L. GALLUP  1,974,565
BRAKE
Filed Oct. 26, 1933

INVENTOR
DAVID L. GALLUP
BY
ATTORNEY

Patented Sept. 25, 1934

1,974,565

UNITED STATES PATENT OFFICE

1,974,565
BRAKE

David L. Gallup, South Bend, Ind., assignor to Bendix Aviation Corporation, South Bend, Ind., a corporation of Delaware Application October 26, 1933, Serial No. 695,300

4 Claims. (Cl. 188—2)

This invention relates to brakes, and more particularly to the drum seals therefor, and is illustrated as embodied in an internal expanding brake suitable for use on automobiles.

It is well known that road grit, water, and other foreign matter finds its way into brake drums of automobiles, getting into the clearance space between the wearing surfaces of a brake, and operating to score and to increase the wear of said surfaces. Sealing a brake drum by extending the edges thereof or those of the backing plate results in increasing manufacturing difficulties, increasing the weight of the brakes, and in other disadvantages. Sealing of brakes by means of rubber or leather rings involves other difficulties, such as deterioration of leather and rubber, etc.

The objects of my invention are to seal the brake in order to prevent foreign matter from getting between the wearing surfaces thereof; to prevent interference of the sealing means with the rotation of the brake drum; and to provide for taking off the wheel without disassembling said sealing means.

I attain the above objects by providing a brake with two rings or annular members made of sheet metal and of such a form that in cross section they form a tortuous passage preventing penetration of the objectionable substances into the brake drum, and which are so positioned with respect to each other that they have sufficient clearance to allow rotation of the drum and to permit the brake to be taken apart without catching each other by their edges.

Other objects and features of my invention, and desirable particular constructions, will be apparent from the following description of the illustrative embodiments shown in the acompanying drawing, in which.

Figure 1:
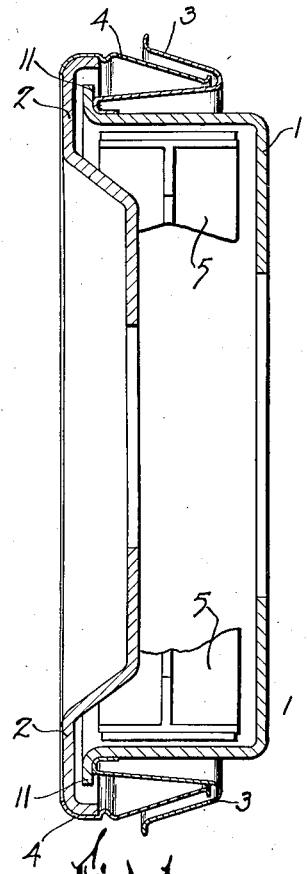
Figure 1 is a vertical sectional view of an automobile internal expanding brake showing the general arrangement of the annular members.

Referring now more particularly to Figure 1, the brake selected for illustration includes a drum 1, which is secured to a wheel (not shown). The open side of the drum is closed by a stationary backing plate 2. Within the brake drum are brake shoes 5 which are expanded into a contact with the drum 1 by any suitable actuating mechanism (not shown). The drum 1 has a radial flange 11 formed on it, while the edges of the backing plate 2 are formed in such a manner that in cross section they form a curved passage around said flange 11 of the drum 1.

The drum 1 is provided in accordance with my invention with an annular baffle member 3 of substantially V-shaped cross section, which member is secured to the drum 1 adjacent the flange 11. The open side of the member 3 is adapted to receive a second annular baffle member 4, which is secured to the backing plate 2 as shown.

Sufficient clearance is provided between the members 3 and 4 to permit independent rotation of the member 3, which member of course rotates with the drum 1, while the member 4, secured to the backing plate, is stationary with respect to the drum. The free edges of both members are bent up as shown, giving greater rigidity to said members at their edges, where they are apt to be easily bent. Another function performed by the bent edges is that of forming recesses to collect the dirt, thus preventing it from getting into the brake drum.

Both of members 3 and 4 are made preferably of sheet metal. The member 3 is welded to, or shrunk on the drum 1. The member 4 may be secured to the backing plate 2 either by rolling it on said plate, or it can be made split once or twice and held on said backing plate by a bolt 6 engaging suitable flanges 7, as shown in Figure 3.

The sealing action of the above-described construction results from the provision of a relatively long tortuous path, making penetration of road grit into the brake drum more difficult, and is also due to the provision of the recesses which operate to arrest the dust particles on their way toward the inside of the brake drum. It will be readily understood from examination of Figure 1 that provision of the annular members does not interfere with disassembling of the wheel, inasmuch as members 3 and 4 can be separated along their axis without catching each other.

Figure 2:
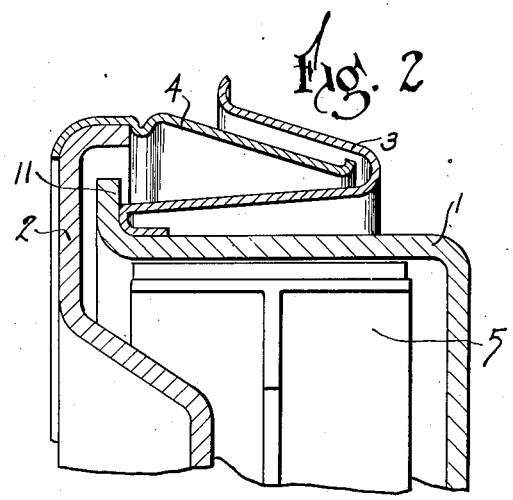
Figure 2 is a vertical sectional view of a portion of brake showing the sealing members more particularly.
Figure 3:
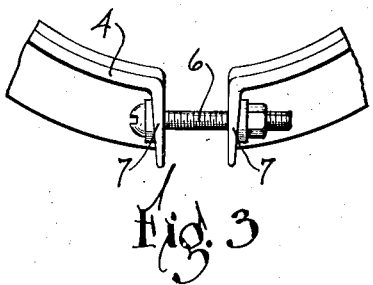
Figure 3 shows a possible construction of the lower part of the inner member.
Figure 4:
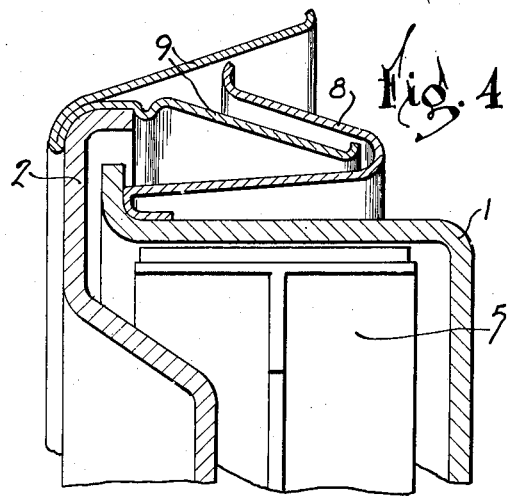
Figure 4 shows a modified form of the invention.

Figure 4 shows a modification of the construction shown in Figures 2 and 3. This construction includes baffle members 8 and 9, both of V-shaped cross section, each having a flange which extends into the recess formed by the other.

Although I have herein shown and described the preferred embodiment of my invention with some modifications, it is to be understood that the same is susceptible to further changes fully comprehended by the spirit of the invention as herein described and the scope of the appended claims.

I claim:

1. In combination with a brake comprising a rotatable drum and a stationary backing plate, an annular baffle member of V-shaped cross section secured to the backing plate, and a second baffle member secured to the drum and having a portion extending into the recess formed by the first mentioned baffle member.

2. In combination with an automobile brake, two annular members adapted to be secured separately one to the rotating part of said brake and the other to the non-rotating part thereof, said members entering each other in such a manner as to form in cross section an elongated tortuous path operating to prevent the road grit from entering the inside of the brake, said members having a sufficient amount of clearance between them to assure their independent rotation, and being adapted to separate along their axis without obstructing each other.

3. A device as defined in claim 2 having the free edges of the annular members bent away from their axis in order to form dirt arresting corners.

4. A device of the character described comprising, in combination with an internal expanding automobile brake, a sheet metal ring having its base secured to the backing plate of the brake and having its free edge extending over the drum; an annular sheet metal member of a V-shaped cross section having its base secured to the brake drum and having its open side turned toward the backing plate and receiving therein the free edge of said ring, said member having a flange extending toward the base of said ring, the free edges of both members being bent away from their axis to form dirt arresting corners.

DAVID L. GALLUP.